(12) United States Patent
Nakamura et al.

(10) Patent No.: US 8,207,986 B2
(45) Date of Patent: *Jun. 26, 2012

(54) DISPLAY CONTROL DEVICE, IMAGE PROCESSING APPARATUS AND DISPLAY CONTROL METHOD

(75) Inventors: Mahina Nakamura, Musashino (JP); Maki Sato, Yokohama (JP); Tsunehiro Motegi, Shinjuku-ku (JP); Yumiko Okuma, Nakano-ku (JP); Yasutsugu Sasaki, Kawasaki (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 1007 days.

This patent is subject to a terminal disclaimer.

(21) Appl. No.: 11/736,690

(22) Filed: Apr. 18, 2007

(65) Prior Publication Data
US 2007/0247642 A1    Oct. 25, 2007

(30) Foreign Application Priority Data
Apr. 21, 2006   (JP) .................... 2006-117755

(51) Int. Cl.
G09G 5/00 (2006.01)
G09G 5/08 (2006.01)
G06F 15/00 (2006.01)
G06F 3/00 (2006.01)
G06F 3/048 (2006.01)
G06K 9/36 (2006.01)

(52) U.S. Cl. ......... 345/619; 345/157; 358/1.1; 382/232; 715/243; 715/745; 715/763; 715/789

(58) Field of Classification Search ............ None
See application file for complete search history.

(56) References Cited

U.S. PATENT DOCUMENTS

2003/0063128 A1* 4/2003 Salmimaa et al. ............ 345/810
2004/0128359 A1* 7/2004 Horvitz et al. ................ 709/207
2004/0215657 A1* 10/2004 Drucker et al. ............ 707/104.1
2007/0247641 A1   10/2007 Okuma et al.
(Continued)

FOREIGN PATENT DOCUMENTS
CN     1260683      7/2000
(Continued)

OTHER PUBLICATIONS

Chinese Office Action mailed on Feb. 6, 2009.
(Continued)

*Primary Examiner* — Tize Ma
(74) *Attorney, Agent, or Firm* — Turocy & Watson, LLP (57) ABSTRACT

A display control device is provided, which can display, on a screen, a plurality of display objects related to a process object to undergo a predetermined process. The device comprises: an object-information acquisition unit that acquires information; an extraction unit that extracts some display objects having a specific relation with the process object; an importance-information acquisition unit that acquires information representing a degree of importance that the display object has in connection with display on the screen; and a control unit that displays the display objects extracted by the extraction unit in accordance with the information in a display region composed of substantially ring-shaped first to n-th regions (n is 2 or a gr ater integer) concentric to one another, such that a display object having a higher degree of importance than a display object displayed in an x-th region is displayed in an (x−1)th region located inside the x-th region.

18 Claims, 8 Drawing Sheets

U.S. PATENT DOCUMENTS

| | | |
|---|---|---|
| 2007/0247643 A1 | 10/2007 | Nakamura et al. |
| 2007/0250785 A1 | 10/2007 | Nakamura et al. |
| 2007/0250936 A1 | 10/2007 | Nakamura et al. |
| 2007/0283293 A1 | 12/2007 | Nakamura et al. |

FOREIGN PATENT DOCUMENTS

| | | |
|---|---|---|
| CN | 1713123 | 7/2008 |
| JP | 09-269702 | 10/1997 |
| JP | 10-315587 | 12/1998 |
| JP | 11-194669 | 7/1999 |
| JP | 2005-151190 | 6/2005 |
| JP | 2005-212137 | 8/2005 |

OTHER PUBLICATIONS

Japanese Office Action for Application No. 2006-117755 mailed on Mar. 22, 2011.

* cited by examiner

| | DISPLAY OBJECT | SELECTION FREQUENCY (TIMES/MONTH) | DEGREE OF IMPORTANCE |
|---|---|---|---|
| GROUP1 | ICON701 | 230 | 1 |
| | ICON702 | 120 | 2 |
| | ICON703 | 68 | 3 |
| | ICON704 | 44 | 4 |
| | ICON705 | 37 | 5 |
| | ICON706 | 28 | 6 |
| | ICON707 | 19 | 7 |
| GROUP2 | ICON708 | 15 | 8 |
| | ICON709 | 12 | 9 |
| | ICON710 | 11 | 10 |
| | ICON711 | 9 | 11 |
| | ICON712 | 7 | 12 |
| | ICON713 | 5 | 13 |
| | ICON714 | 4 | 14 |
| | ICON715 | 4 | 15 |
| GROUP3 | ICON716 | 3 | 16 |
| | ICON717 | 1 | 17 |
| | ICON718 | 0 | 18 |

FIG.6

| | DISPLAY OBJECT | SELECTION FREQUENCY (TIMES/MONTH) | DEGREE OF IMPORTANCE |
|---|---|---|---|
| GROUP1 | ICON701 | 230 | 1 |
| | ICON702 | 120 | 2 |
| | ICON703 | 68 | 3 |
| | ICON704 | 44 | 4 |
| | ICON705 | 37 | 5 |
| | ICON706 | 28 | 6 |
| | ICON707 | 19 | 7 |
| GROUP2 | ICON601 | 17 | 8 |
| | ICON602 | 12 | 9 |
| | ICON603 | 11 | 10 |
| | ICON713 | 9 | 11 |
| | ICON712 | 7 | 12 |
| | ICON711 | 5 | 13 |
| | ICON604 | 4 | 14 |
| | ICON714 | 4 | 15 |
| | ICON715 | 3 | 16 |
| GROUP3 | ICON605 | 2 | 17 |
| | ICON717 | 1 | 18 |
| | ICON718 | 0 | 19 |

FIG.8

DISPLAY CONTROL DEVICE, IMAGE PROCESSING APPARATUS AND DISPLAY CONTROL METHOD

BACKGROUND OF THE INVENTION

1. Field of the Invention

The present invention relates to an interface screen that displays display objects such as characters and icons. More particularly, the invention relates to a technique of controlling the displaying of display objects on interface screens.

2. Description of the Related Art

Hitherto, to set conditions of processing images, on an interface screen, the icons (display objects) corresponding to items desired are selected from the items classified under tabs or the like and are then set on the interface screen.

On such a conventional interface screen, the items that can be set to perform a process are arranged over a plurality of tabs (setting menus). (See, for example, Jpn. Pat. Appln. Laid-Open Publication No. 11-194669 and Jpn. Pat. Appln. Laid-Open Publication No. 9-269702.)

On the conventional interface screen, the user must find the icon corresponding to the desired item to set, while switching a plurality of tabs (setting menus), each time from one tab to another, though he or she only needs to perform a single process. The conventional interface screen is disadvantageous, because the set items cannot be seen at a glance and the user's work efficiency is inevitably reduced.

SUMMARY OF THE INVENTION

An embodiment of the present invention has been made in order to solve the problems described above. An object of this invention is to provide a technique of displaying display objects, such as icons, which correspond to a process object to be subjected to a specific process, at appropriate positions on a screen, thus providing convenience on the part of the user.

To solve the problems, a display control device according to an aspect of this invention is designed to display, on a screen, a plurality of display objects related to a process object to undergo a predetermined process. The device comprises: an object-information acquisition unit that acquires information for identifying the process object; an extraction unit that extracts, from the display objects, some display objects having a specific relation with the process object identified on the basis of the information acquired by the object-information acquisition unit; an importance-information acquisition unit that acquires information representing a degree of importance that the display object extracted by the extraction unit has in connection with display on the screen; and a control unit that displays, in accordance with the information acquired by the importance-information acquisition unit, the display objects extracted by the extraction unit in a display region composed of substantially ring-shaped first to n-th regions (n is 2 or a greater integer) concentric to one another, such that a display object having a higher degree of importance than a display object displayed in an x-th region is displayed in an (x−1)th region located inside the xth region (x is 2 or a greater integer).

An image processing apparatus according to another aspect of this invention comprises: a display control device of the type described above; an operation input unit that receives operation instructions a user has input by operating the display control device in accordance with information displayed on the display control device; and an image-processing unit that performs a specific image processing in accordance with the operation instructions received by the operation input unit.

A display control method according to still another aspect of this invention is designed to display, on a screen, a plurality of display objects related to a process object to undergo a predetermined process. The method comprises: acquiring information for identifying the process object; extracting, from the display objects, some display objects having a specific relation with the process object identified on the basis of the information for identifying the process object; acquiring information representing degrees of importance that the display objects extracted have in connection with display on the screen; and displaying, in accordance with the information acquired and representing the degree of importance, the display objects extracted, in a display region composed of substantially ring-shaped first to n-th regions (n is 2 or a greater integer) concentric to one another, such that a display object having a higher degree of importance than a display object displayed in an x-th region is displayed in an (x−1)th region located inside the xth region (x is 2 or a greater integer).

A display control device according to a further aspect of this invention is designed to display, on a screen, a plurality of display objects related to a process object to undergo a predetermined process. This device comprises: an object-information acquisition means for acquiring information for identifying the process object; an extraction means for extracting, from the display objects, some display objects having a specific relation with the process object identified on the basis of the information acquired by the object-information acquisition means; an importance-information acquisition means for acquiring information representing a degree of importance that the display object extracted by the extraction means has in connection with display on the screen; and a control means for displaying, in accordance with the information acquired by the importance-information acquisition means, the display objects extracted by the extraction means in a display region composed of substantially ring-shaped first to n-th regions (n is 2 or a greater integer) concentric to one another, such that a display object having a higher degree of importance than a display object displayed in an x-th region is displayed in an (x−1) th region located inside the x-th region (x is 2 or a greater integer).

DESCRIPTION OF THE EMBODIMENTS

Figure 1:
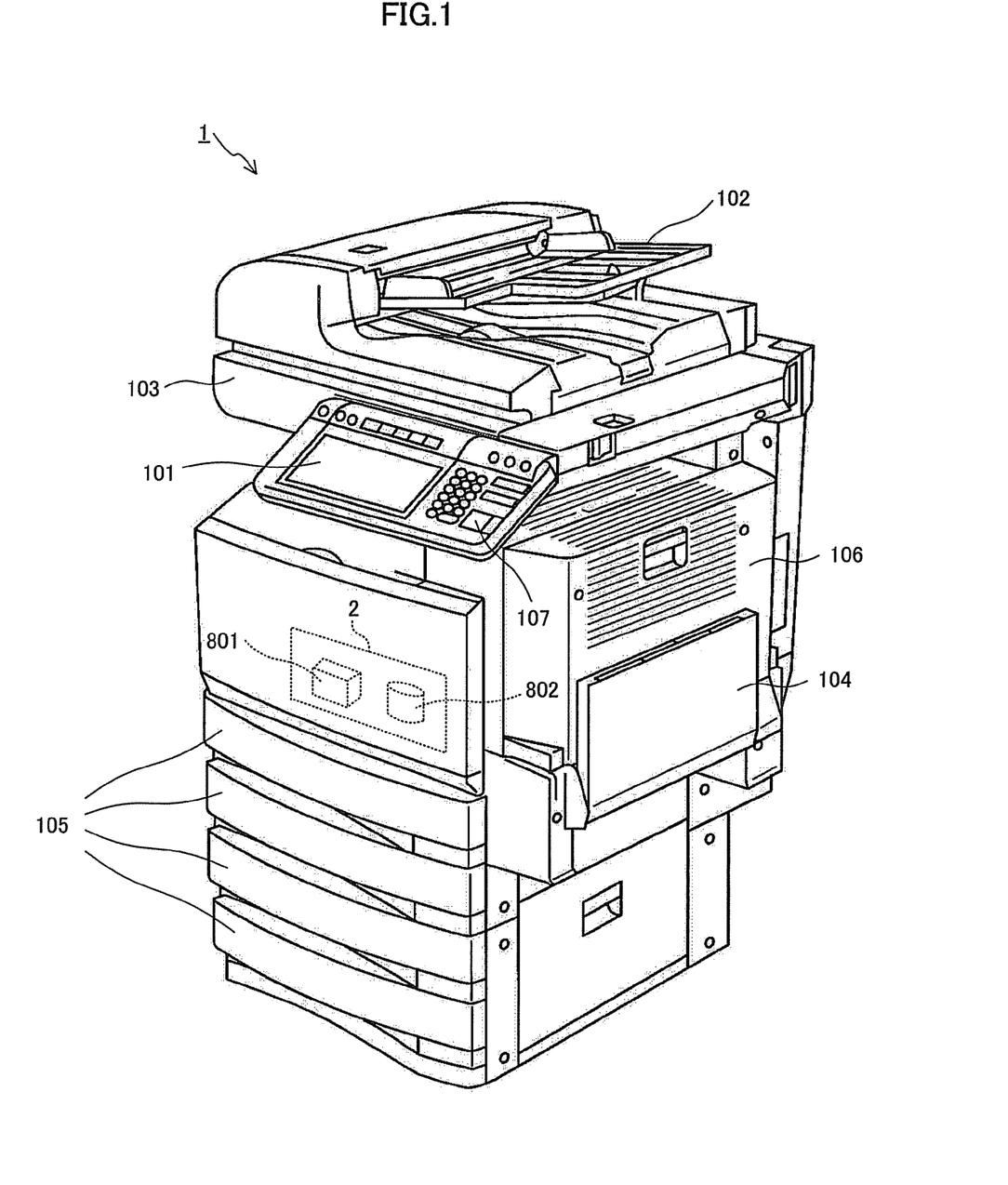
FIG. 1 is a perspective view showing the outer appearance of an image processing apparatus 1 having a display control device 2 according to an embodiment of the present invention.

An embodiment of the present invention will be described, with reference to the accompanying drawings. FIG. 1 is a perspective view explaining the basic configuration of an image processing apparatus 1 having a display control device 2 according to an embodiment of this invention. The image processing apparatus 1 is, for example, a multi function peripheral (MFP).

The image processing apparatus 1 according to the present embodiment comprises an interface screen 101, an auto document feeder (ADF) 102, an image-reading unit 103, a manual sheet-feeding unit 104, a sheet cassette 105, an image-forming unit 106, an authentication process unit 107, and a display control device 2.

How the image processing apparatus 1 operates will be briefly explained with reference to the accompanying drawings. Assume that the image processing apparatus 1 is set in copy mode to perform a copy process (i.e., a prescribed image processing). First, the authentication process unit 107 authenticates the user. If authenticated, the user touches the interface screen 101, inputting operation instructions. In accordance with the instructions, the original document placed on the ADF 102 is automatically transported to the image-reading position. At the image-reading position, the image-reading unit 103 (i.e., an image-processing unit) reads images from the original document. Meanwhile, a paper sheet is fed to the image-forming unit 106 (i.e., another image-processing unit) from either the sheet cassette 105 or the manual sheet-feeding unit 104, in accordance with the instructions input at the interface screen 101. The sheet thus fed is transported to the image-forming unit 106. The unit 106 forms an image on the sheet in accordance with the image read by the image-reading unit 103. The document is thereby copied.

The interface screen 101 comprises, for example, a touch panel display. The panel 101 functions as an operation input unit that receives the operation instructions the user has input by touching the icons displayed on the interface screen 101.

The display control device 2 will be described in detail. The display control device 2 has the function of displaying, on the interface screen 101, information items such as characters and icons, which are related to different processes which the image processing apparatus 1 can perform on objects, such as "send", "favorites", "scan preview", "print," "save", and "box". Here, the "characters" include symbols, and the "icons" include figures. With the display control device according to the present embodiment, display objects, each consisting of characters, or an icon, or both characters and an icon, can be displayed. For simplicity of description, however, the display objects will be referred to, generally as "icons," in the following description. The process objects to undergo the above-mentioned processes in the image processing apparatus 1 are, for example, original document sheets, originals in the form of books, image information, and the like.

Figure 2:
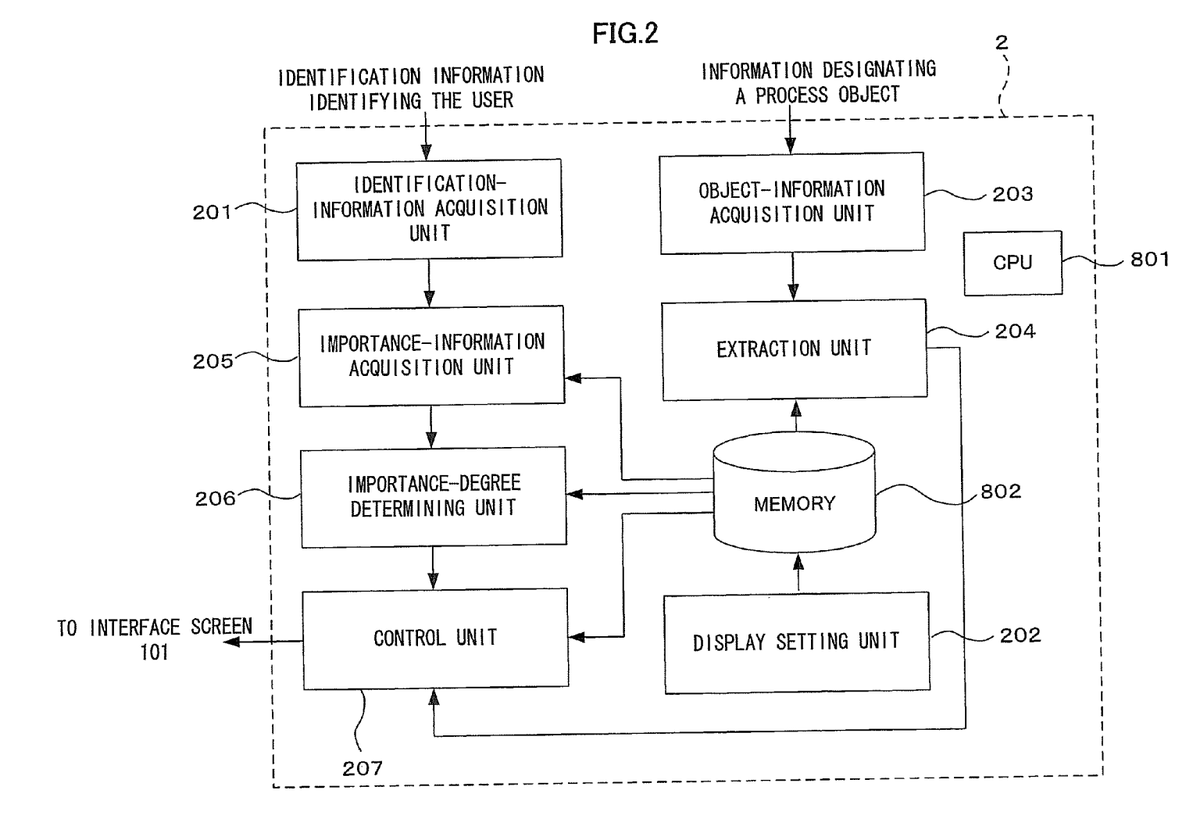
FIG. 2 is a function block diagram explaining the display control device 2 according to the embodiment.

FIG. 2 is a function block diagram explaining the display control device 2 according to this embodiment. The display control device 2 according to this embodiment comprises an identification-information acquisition unit (identification-information acquisition means) 201, a display setting unit (display setting means) 202, an object-information acquisition unit (object-information acquisition means) 203, an extraction unit (extraction means) 204, an importance-information acquisition unit (importance-information acquisition means) 205, an importance-degree determining unit (importance-degree determining means) 206, a control unit (control means) 207, a CPU 801, and a memory 802.

The identification-information acquisition unit 201 acquires identification information such as the user ID obtained when the authentication process unit 107 authenticates the user. The authentication process unit 107 authenticates the user when the antenna on it reads the user ID from the non-contact IC card the user holds. The user identification can be obtained in the authentication process unit 107, not only by reading it not only from the IC card but also by inputting it by operating keys or by inputting user's biological information, such as fingerprint or voiceprint, in biometric authentication.

Figure 3:
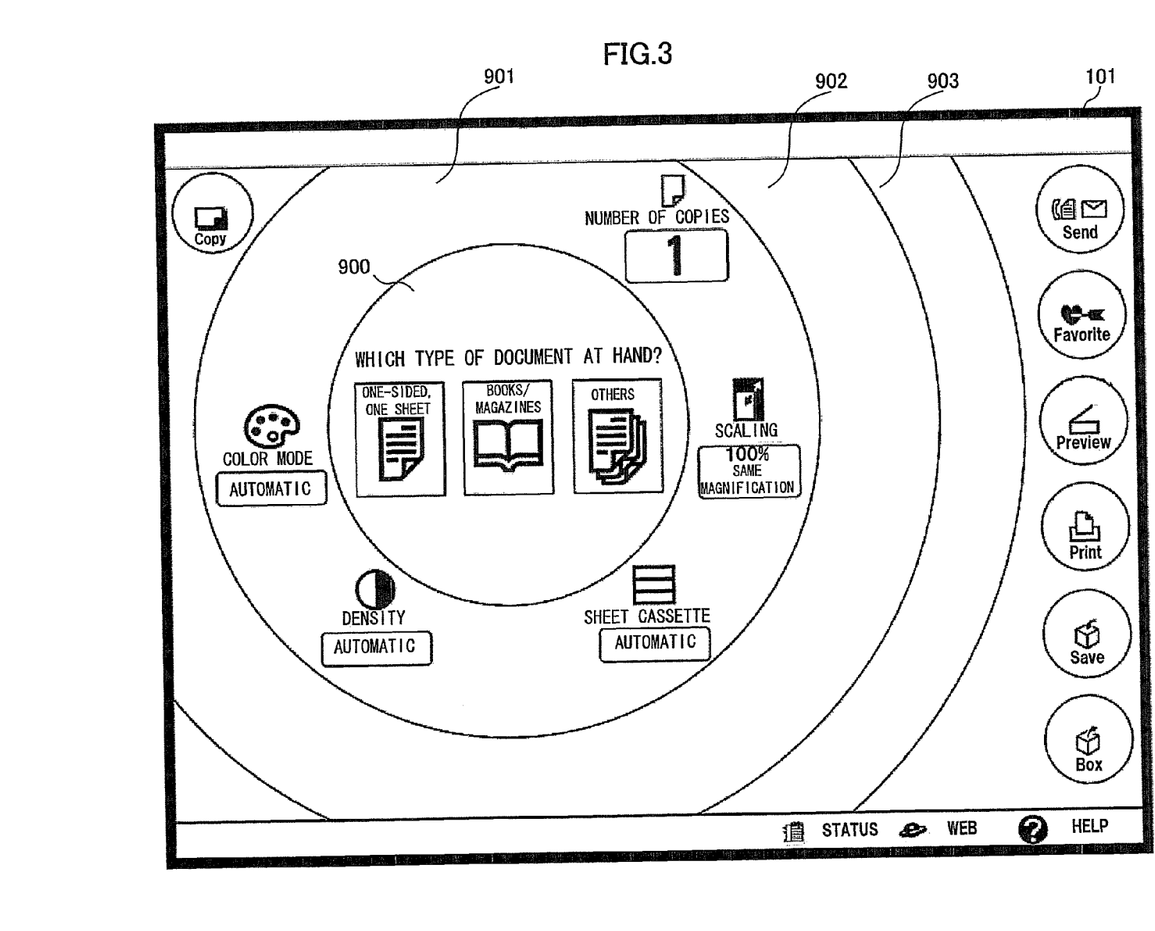
FIG. 3 is a diagram depicting the menu that is displayed on the image processing apparatus 1 when the copy process is performed.

The object-information acquisition unit 203 acquires information for identifying process objects. FIG. 3 shows the menu that is displayed on the image processing apparatus 1 when the copy process is performed. As FIG. 3 shows, on the interface screen 101, the control unit 207 displays a display region as described later, which is composed of the first ring-shaped region 901 to the third ring-shaped region 903. The first ring-shaped region 901 lies inside the second ring-shaped region 902, and the second ring-shaped region 902 lies inside the third ring-shaped region 903. In the first ring-shaped region 901 (at the center of the display region), a plurality of icons for selecting (designating) the types of documents to copy, i.e., the process objects are displayed. When the user selects one of the icons displayed as described above, i.e., "one-sided, one sheet," "books/magazines" and "others," displayed on the interface screen 101, the object-information acquisition unit 203 acquires the information allocated to the icon selected.

Further, the object-information acquisition unit 203 determines the type of the document, i.e., process object, by, for example, sensors provided on the ADF 102, the sheet cassette 105, the manual sheet-feeding unit 104, and the like. Thus, the unit 203 can acquire the information about the document type determined, as information identifying the process object. Alternatively, the unit 203 can receive that information from an external apparatus that can communicate with the image processing apparatus 1.

Figure 4:
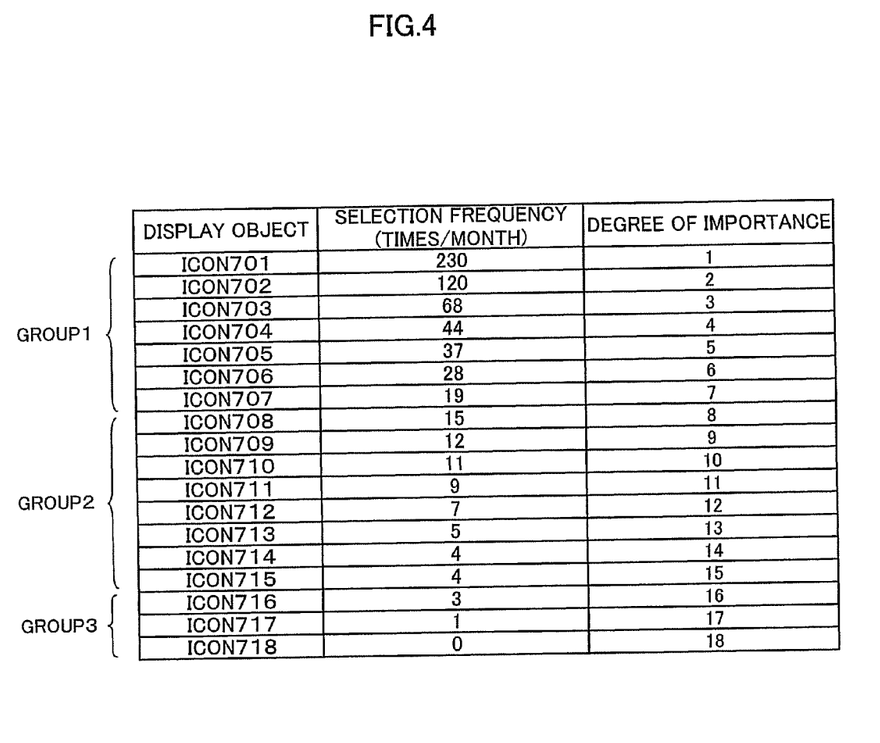
FIG. 4 is a table of icons 701 to 718 extracted by the extraction unit 204.

On the basis of the information acquired by the object-information acquisition unit 203, the extraction unit 204 extracts, from the memory 802, an icon related to the process object identified with the information, selected from the icons corresponding to the items to set for a specific process. The "icon related to the process object identified with the information" is an icon that corresponds to a set item that can be used in a specific process (e.g., copy) performed on an object (e.g., original document). The icon has been preset. Otherwise, the "icon related to the process object identified with the information" may be an icon that is selected (as an item set to perform a specific process on the object) at a frequency exceeding a predetermined threshold value, in connection with the process object. FIG. 4 is a table of icons 701 to 718 the extraction unit 204 have extracted.

The importance-information acquisition unit 205 acquires information items about the degrees of importance allocated to the respective icons extracted by the extraction unit 204. More specifically, the importance-information acquisition unit 205 acquires, from the memory 802, the information about a selection history (so-called operation log) of the icons used by the user identified with the identification information acquired by the identification-information acquisition unit 201 in connection with the object to undergo the process presented by the icons. The information about the selection history is acquired as information representing the relation between the icons extracted by the extraction unit 204 and the objects to be processed. If the items set to a certain icon should be preferentially displayed on the screen, regardless of the frequency at which the icon was selected in the past, they may be always much related to that icon. In the table of FIG. 4, the frequency at which the user has selected icons in connection with a process object, "one-sided, one sheet" document is a information item about the importance. The above-mentioned "information items about the degrees of importance," which the importance-information acquisition unit 205 acquires, is not limited to the frequency at which the icon is selected in connection with a process object. Rather, it may be the frequency at which the icon is selected not in connection with any process object.

In the present embodiment, the icons to be displayed on the interface screen 101 may be divided beforehand into groups, in some cases. In this case, the object-information acquisition unit 203 acquires, from the memory 802, information items about each group of icons (e.g., group name, group identification number, and the like).

On the basis of the information acquired by the importance-information acquisition unit 205, the importance-degree determining unit 206 determines that the more any icon is related to the process object, the more important the icon is. More precisely, the importance-degree determining unit 206 determines, from the information acquired by the importance-information acquisition unit 205, that the more frequently an icon has been selected, the more it is related to the process object (that is, the more important it is).

Figure 5:
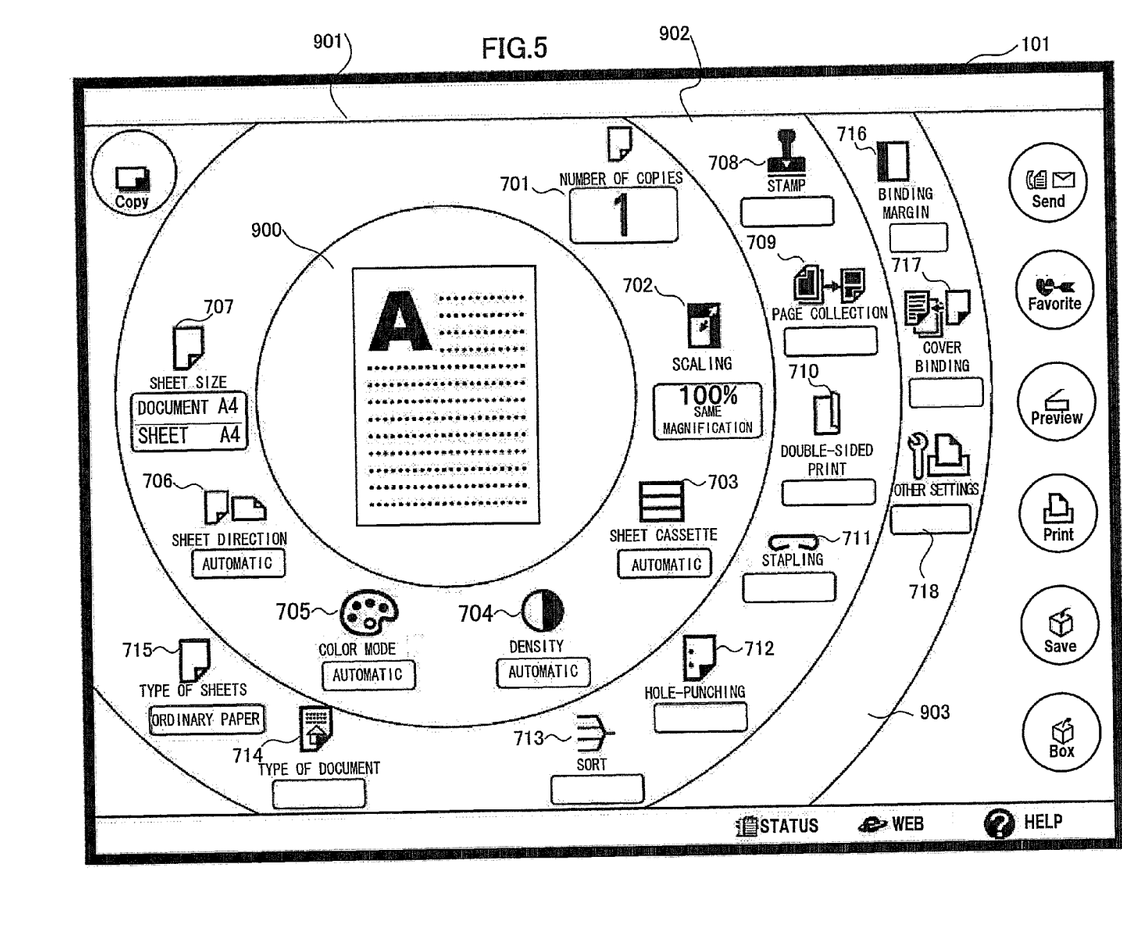
FIG. 5 is a diagram showing icons 701 to 718 displayed on the menu, which have been extracted by the extraction unit 204.

When the identification information acquired by the identification-information acquisition unit 201 is logged in, the control unit 207 displays the icons extracted by the extraction unit in a display region composed of substantially ring-shaped first to n-th regions (n is 2 or a greater integer) concentric to one another, such that an icon having a higher degree of importance than an icon displayed in an x-th region is displayed in an (x−1)th region located inside the x-th region (x is 2 or a greater integer), in accordance with the importance degrees that the importance-degree determining unit 206 has determined from the selection history of the user identified with the identification information (see FIG. 5). If the information acquired by the importance-information acquisition unit 205 directly indicates the display priority that some icons have in the screen, the control unit 207 can, of course, display the icons extracted by the extraction unit 204 in accordance with this information, such that the icons more important than those to be displayed in the x-th region are displayed in the (x−1)th region.

Thus, the display priority for the icons extracted can be defined on the basis of the operation log concerning the icons that the user has selected in connection with the process object. Once this priority has been defined, the icons will be arranged in the descending order of frequency in which the user may select icons in connection with the process object. Hence, the higher the selection frequency an icon has, the more conspicuously the icon will be displayed. This provides a user-friendly interface screen.

In the table of FIG. 4, the selection frequency of each icon is the frequency for month. The frequency is not limited to this, nevertheless. The frequency may instead be, for example, the frequency for year or over the use of the image processing apparatus 1. Further, the frequency at which each icon is selected every time the user ID is logged in may be recorded based on the user ID, wherever the icon is selected, in the image processing apparatus or a personal computer (PC), and may then be used as selection frequency of the icon.

All icons related to any object to undergo a specific process are thus extracted from a plurality of candidate icons and then displayed. The icons representing all set items related to the process object can therefore be displayed, unlike on the interface screens of the conventional configuration. In addition, the interface screen has a simple configuration. Hence, the user proceed with operation, looking at only the icons (i.e., set items) related to the process object, without necessity of switching the display screen to another. This makes it possible for the user to see all icons at a glance and to retrieve desired icons with ease. In this embodiment, the icons much related to the process object are displayed in a plurality of ring-shaped regions as shown in FIG. 5, and more detailed set items are displayed on a pull-down menu or a popup menu when an icon for them is selected.

The more important an icon is, the inner the ring-shaped region it is displayed in. Thus, icons that need to draw the user's attention or icons that are important can be displayed, together in a specific area on the screen. Particularly, the icons the user frequently selects can be arranged automatically at such a position as to draw the user's attention, on the basis of their degrees of importance determined from the frequencies at which the user has selected them. This helps to make the screen user-friendly.

In the present embodiment, each icon allocated to one set item belongs to any one of the groups that are displayed in the ring-shaped regions, respectively. Here, groups 1 to 3 are displayed in the first to third ring-shaped regions 901 to 903, respectively. Icons 701 to 707 belong to group 1, icons 708 to 715 to group 2, and icons 716 to 718 to group 3 (see FIG. 4). The number of icons that can belong to a certain group is determined by the number of icons that can be displayed in the ring-shaped region allocated to the group.

The control unit 207 displays the icons of each group in one ring-shaped region in accordance with the information the importance-information acquisition unit 205 has acquired. That is, the more important the icons of any group, the inner the region they are displayed in. The icons belonging to any group are displayed in the ring-shaped region that is allocated to the group. Thus, the importance of any icon belonging to a group can be determined in accordance with the group to which it belongs.

The control unit 207 displays the icons of each group in a specific manner. The more important each icon is, the more upstream it is displayed in the clockwise direction with respect to a certain position above the center of the region. Thus, the icons are arranged in the clockwise direction, in the descending order of importance. This more attracts the user's attention to important icons than to the other icons, because of the human behavior of looking at objects in the clockwise direction if they are arranged in a circle.

Further, the control unit 207 may display icons in each ring-shaped region, from upstream in the clockwise direction at regular intervals from a predetermined position in the region. On the conventional interface screen on which tabs are displayed, set items that are unnecessary or cannot be selected are displayed in gray-out state. The icons in gray-out state occupy some space on the screen. Inevitably, the icons corresponding to all set items can hardly be displayed all together on the screen. In the present embodiment, the icons extracted from a plurality of candidate icons are displayed, arranged at short intervals, from a predetermined position in ring-shaped regions. All icons related to a process object can be displayed all together in a region on the screen. The display area on the screen can be used with high efficiency. The makes it easier for the user to see all icons at a glance.

The ring-shaped regions need not be perfectly circular. They may instead be of a shape with a missing part (i.e., substantially ring-shaped). In other words, they suffice to have such a shape as one surrounds the immediately inner ring-shaped region, so that the user may recognize which region is inside any other. The user can know the importance of each icon from the radius of the ring-shaped region in which the icon is displayed, the radius being a distance from the center of the ring-shaped region. Moreover, more icons can be displayed than in the case where the icon groups are classified in the form of tabs or tree-hierarchal items. In view of this, it is desirable that the regions be "shaped like a ring." Nevertheless, the regions are not limited to ring-shaped ones. For example, they may be ring-shaped and have a polygonal contour. Further, the adjacent ring-shaped regions need not be similar in contour. They may rather have different contours.

The control unit 207 displays the display region composed of the first to third ring-shaped regions, either on the left side of the center of the screen or above the center thereof, or both on the left and above the center. There is a general principle that is observed in designing user interfaces. That is, the important items are arranged on the left part of the screen or in the upper part thereof, while the items not so important are arranged on the right part of the screen or in the lower part thereof. It is therefore desired that icons be arranged on the screen in accordance with the general design principle. More precisely, the entire display region is located on the left of the center of the screen, above the center of the screen, or at an upper-left position with respect to the center of the screen. Thus, the icons important for the user are displayed on the left of the center of the screen, above the center of the screen, or on the left to and above the center of the screen. And the icons of low degree of importance, which are displayed in the outer ring-shaped region, are located on the right of the center of the screen, below the center of the screen, or on the right of and below the center of the screen. Therefore, the icons can be arranged in a manner that accords with the general design principle (i.e., manner natural to the user). This helps to facilitate the user's operation.

In accordance with the instructions input by the user, the display setting unit 202 sets the positions in each ring-shaped region, where any given icon among the icons and character icons should be displayed on the interface screen 101. The control unit 207 is configured to display any icon at the position in the ring-shaped region, which has been set by the display setting unit 202.

Hence, any icon can be displayed always at any desired position in any ring-shaped region. Regardless of the use frequency or the grouping, any icon that should be displayed always at a desired position can be displayed at that position. This renders the apparatus 1 useful for a user who have learned the functions of the various icons in association with the positions the icons assumes on the screen and for visually handicapped users.

Figure 6:
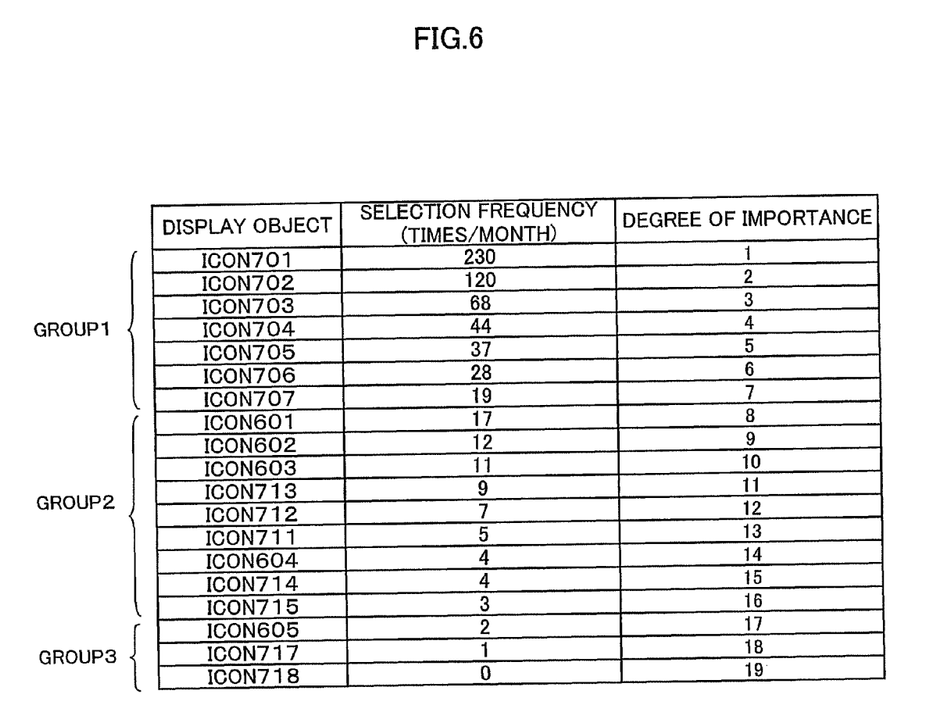
FIG. 6 is a table of the icons extracted by the extraction unit 204, when "books/magazines" is selected as original document on the menu of FIG. 3.
Figure 7:
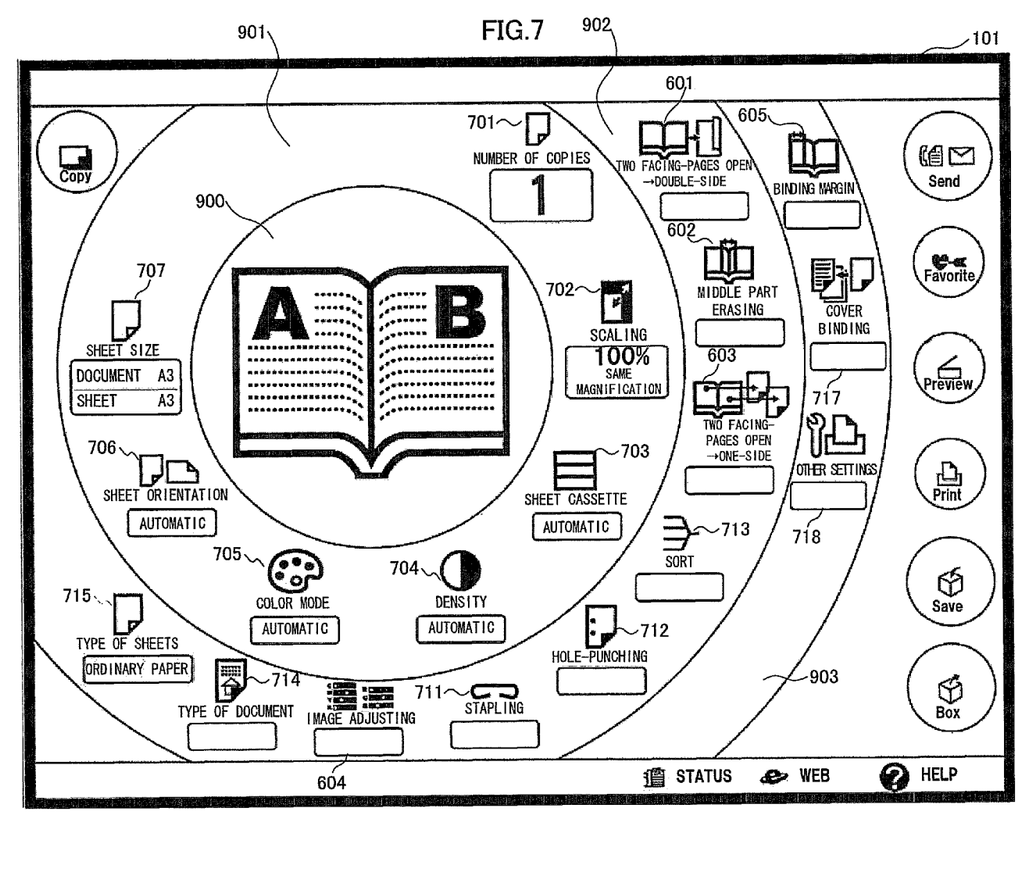
FIG. 7 is a diagram depicting a menu the control unit 207 displays in accordance with the extracted icons and importance information, which are shown in FIG. 6.

FIG. 6 is a table of the icons extracted by the extraction unit 204, when "books/magazines" is selected as original document on the menu of FIG. 3. FIG. 7 is a diagram depicting a menu the control unit 207 displays in accordance with the extracted icons and importance information, which are shown in FIG. 6. As seen from FIGS. 6 and 7, the original document (i.e., process object) selected may be "books/magazines." If this is the case, icons representing the set items, such as "double-sided print," which can be selected to perform image processing on "one-sided, one sheet" documents will not be displayed. Displayed in this case are only the icons that can be selected only if the document is a book, such as "two facing-pages open→double-sided," "intermediate page deleted" and "two facing-pages open→one-side." Thus, if the document is "books/magazines," the icons not related to the set items are not displayed, providing a vacant display area, and the icons related to the set items that can be selected when the document is a book are displayed in the display area thus provided. As many icons representing useful set items as possible can thereby displayed at a time.

Moreover, the control unit 207 displays any frequently selected item set along with an already set item (e.g., an item selected at a frequency higher than a predetermined value) as a recommendable item, in an emphasized form, in the course of setting various items to perform a certain process, regardless of the type of the document selected at the start of performing the process. The recommendable set item is displayed in an emphasized form, the user can retrieve it easily or by intuition, unlike on the conventional interface screen. Note that such a set item can be emphatically displayed by changing, for example, at least one of the items selected from the group of consisting of the font of characters, the thickness of character strokes, the shape of icons, the luminance of icons, the sizes of icons, the motion of icons, the degree of saturation of icons, and the contrast of icons to the background. Further, if any item corresponding to an object displayed in a substantially ring-shaped region has been set, a display object corresponding to a set item prescribed as an item to be selected next to that set item can be displayed in an emphasized form. Thus, operation guidance can be achieved in a manner agreeable to the designer of the interface screen.

Figure 8:
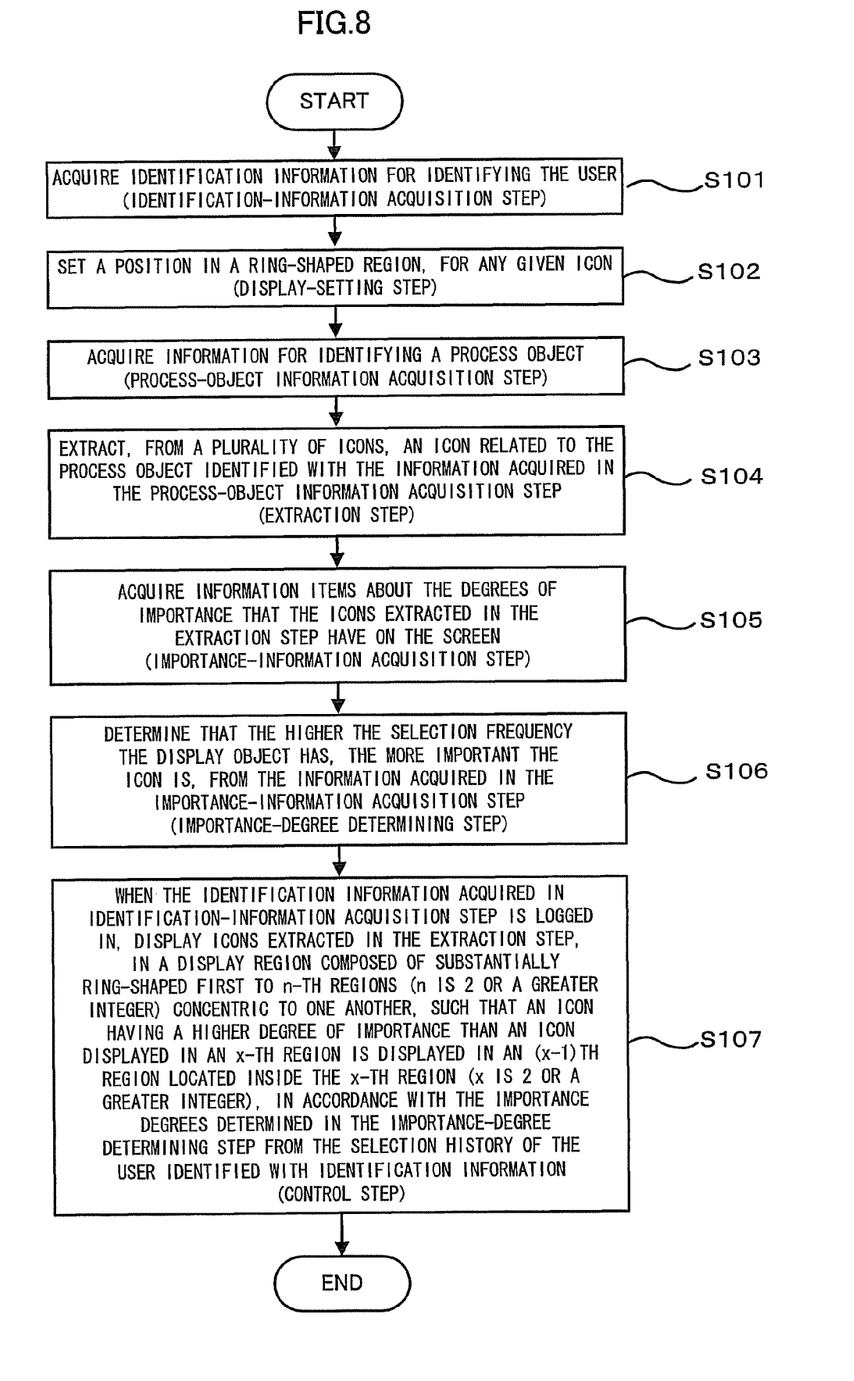
FIG. 8 is a flowchart explaining a process (display control method) performed in the image processing apparatus 1 according to the embodiment.

FIG. 8 is a flowchart explaining a process (display control method) performed in the image processing apparatus 1 according to the embodiment.

First, the identification-information acquisition unit 201 acquires identification information for identifying the user (identification-information acquisition step) (S101).

The display setting unit 202 sets a position in a ring-shaped region, where any given icon should be displayed (display-setting step) (S102).

The object-information acquisition unit 203 acquires information for identifying an object to be processed (process-object information acquisition step) (S103).

Next, the extraction unit 204 extracts, from a plurality of icons, an icon related to the process object identified with the information acquired in the process-object information acquisition step (extraction step) (S104). The "icon related to the process object" is, for example, an icon that corresponds to a set item that may be used to perform that process on the object.

The importance-information acquisition unit 205 acquires information items about the degrees of importance that the icons extracted in the extraction step have on the screen (importance-information acquisition step) (S105). More specifically, in the importance-information acquisition step, the information about a selection history of the icons selected by the user identified with the identification information acquired in the identification-information acquisition step in connection with the object to undergo the process presented by the icons.

The importance-degree determining unit 206 determines that the more is any icon related to the process object, the more important the icon is, from the information acquired in the importance-information acquisition step (importance-degree determining step) (S106).

When the identification information acquired in the identification-information acquisition step is logged in, the control unit 207 displays icons extracted in the extraction step, in a display region composed of substantially ring-shaped first to n-th regions (n is 2 or a greater integer) concentric to one another, such that a display object having a higher degree of importance than a display object displayed in an x-th region is displayed in an (x−1)th region located inside the x-th region (x is 2 or a greater integer), in accordance with the importance degrees determined in the importance-degree determining step from the selection history of the user identified with the identification information (control step) (S107). In the control step, the icons of each group are displayed in a specific manner. That is, the more important each icon is, the more upstream it is displayed in the clockwise direction with respect to a certain position above the center of the region. These icons are arranged at predetermined intervals in the clockwise direction, in the ring-shaped region. In the control step, too, the information identifying the process object is displayed in the region inner of the first ring-shaped region.

In the control step, any icon for which a display position has been set in the display-setting step is displayed at the position set. As the flowchart shows, the display-setting step is performed prior to the process-object information acquisition step. The timing of this step is need not be limited to this. This step can be performed at any time only if the items set in this step can be referred to in the control step to display the groups of icons.

In the image processing apparatus 1, each step of any process performed is performed as the CPU 801 executes the display control program stored in the memory 802.

In the present embodiment, the programs describing the functions of this invention are stored in the apparatus as described above. Alternatively, the programs may be downloaded into the apparatus via a network, or a recording medium storing the programs may be installed in the apparatus. The recording medium may be of any type, such as a CD-ROM, so long as it can store the programs and the programs can be read from it. The functions that can be implemented once installed or downloading into the apparatus may of the type that cooperates with the operating system (OS) installed in the apparatus.

Thus, in the present embodiment, only the items that can be set for a process object are displayed on the screen, in preparation for a specific process on that object. Therefore, operation guidance is automatically achieved, preventing the user from hesitating in deciding what to do next.

For the simplicity of explanation, the memory 802 has been described as having a storage area for the information set by the display setting unit 202 and a storage area for the information to be read by the extraction unit 204, importance-information acquisition unit 205, importance-degree determining unit 206 and control unit 207. (That is, the memory 802 stores all information required.) Nonetheless, these storage areas may be replaced by a database or the like that is arranged outside the image processing apparatus 1. That is, the storage areas can be provided anywhere as long as the display setting unit 202, extraction unit 204, importance-information acquisition unit 205, importance-degree determining unit 206 and control unit 207 can exchange the information between them.

The present embodiment is so configured that the selection history of display objects, which is stored in association with the user ID information, is acquired and used in determining the order in which to arrange the display objects. Instead, the ID of the department to which the user belongs may be acquired on the basis of the user ID obtained when the user is authenticated, if the icons are far more frequently selected than the user. In this case, the selection history of icons, concerning all members of the department stored in association with the department ID can be utilized.

In the present embodiment, the image processing apparatus 1 is an MFP. Instead, the apparatus 1 can, of course, be applied to any other apparatuses that perform an image processing including an image forming, image reading, image editing, and imaging, such as a printer, a scanner, a personal computer (PC) and a multi-media kiosk (MMK).

The present invention has been described, with reference to a specific embodiment. Nevertheless, it will be obvious to those skilled in the art that various changes and modifications can be made without departing from the scope and spirit of the present invention.

As has been described in detail, the present invention can provide a technique that can display a plurality of items, such as icons corresponding to objects that will be subjected to specific processes, at appropriate positions on a screen, thus providing convenience on the part of the user.

What is claimed is:

1. A display control device for displaying, on a screen, a plurality of display objects related to a process object to undergo a predetermined process and associated with items set for the predetermined process, said device comprising:
   an object-information acquisition unit that acquires information for identifying the process object;
   an extraction unit that extracts, from the display objects, some display objects corresponding to set items that can be used to perform the predetermined process on the process object identified on the basis of the information acquired by the object-information acquisition unit;
   an importance-information acquisition unit that acquires information representing a degree of importance that the display object extracted by the extraction unit has in connection with display on the screen; and
   a control unit that displays, in accordance with the information acquired by the importance-information acquisition unit, the display objects extracted by the extraction unit in a display region composed of substantially ring-shaped first to n-th regions (n is 2 or a greater integer) concentric to one another, such that a display object having a higher degree of importance than a display object displayed in an x-th region is displayed in an (x−1)th region located inside the x-th region (x is 2 or a greater integer) and displays with emphasis a second display object that has a selection frequency higher than a predetermined value, the selection frequency is a frequency of selecting the second display object after selecting a first display object, if the first display object is selected.

2. The display control device according to claim 1, wherein the control unit displays display objects in each of the ring-shaped regions such that the display objects are arranged in the clockwise direction in the descending order of importance degree, from a certain position above the center of the ring-shaped region.

3. The display control device according to claim 1, in which the importance-information acquisition unit acquires information about a relation between the display objects and the process object, which further comprises a importance-degree determining unit that determines that the more any display object is related to the process object, the more important the display object is, from the information acquired by the importance-information acquisition unit, and in which the control unit displays, on the basis of a degree of importance determined by the importance-degree determining unit, the display objects in the display region composed of substantially ring-shaped first to n-th regions (n is 2 or a greater integer) concentric to one another, such that a display object having a higher degree of importance than a display object displayed in an x-th region is displayed in an (x−1)th region located inside the x-th region (x is 2 or a greater integer).

4. The display control device according to claim 1, which further comprises an identification-information acquisition unit that acquires identification information identifying a user and an importance-degree determining unit which determines that the higher the selection frequency the display object has, the more important the display object is, from the information acquired by the importance-information acquisition unit, in which the importance-data acquisition unit acquires data concerning the selection history of the user corresponding to the ID data acquired by the ID-data acquisition unit, and in which, when the identification information acquired by the identification-information acquisition unit is logged in, the control unit displays, on the basis of a degree of importance determined from the selection history of the user corresponding to the ID data by the importance-degree determining unit, the display objects in the display region composed of substantially ring-shaped first to n-th regions (n is 2 or a greater integer) concentric to one another, such that a display object having a higher degree of importance than a display object displayed in an x-th region is displayed in an (x−1)th region located inside the x-th region (x is 2 or a greater integer).

5. The display control device according to claim 1, wherein the display objects belongs to any one of groups that correspond to the substantially ring-shaped regions, respectively, the importance-information acquisition unit acquires information about the group to which the display objects belong, and the control unit displays the display objects on the basis of the information acquired by the importance-information acquisition unit, such that the more important the display objects of any group are, in the more inner substantially ring-shaped region they are displayed.

6. The display control device according to claim 1, which further comprises a display setting unit that sets positions in each substantially ring-shaped region, where any given display objects are to be displayed, and in which the control unit displays the display objects in the positions in the substantially ring-shaped region, which have been set by the display setting unit.

7. The display control device according to claim 1, wherein the control unit displays the display region on a left side of the center of the screen, above the center of the screen, or both on the left side of the center of the screen and above the center of the screen.

8. An image processing apparatus comprising:
a display control device of the type described in claim 1;
an operation input unit that receives operation instructions a user has input by operating the display control device in accordance with information displayed on the display control device; and
an image-processing unit that performs a specific image processing in accordance with the operation instructions received by the operation input unit.

9. A display control method of displaying, on a screen, a plurality of display objects related to a process object to undergo a predetermined process and associated with items set for the predetermined process, said method comprising:
acquiring information for identifying the process object;
extracting, from the display objects, some display objects corresponding to set items that can be used to perform the predetermined process on the process object identified on the basis of the information for identifying the process object;
acquiring information representing degrees of importance that the display objects extracted have in connection with display on the screen; and
displaying, in accordance with the information acquired and representing the degree of importance, the display objects extracted, in a display region composed of substantially ring-shaped first to n-th regions (n is 2 or a greater integer) concentric to one another, such that a display object having a higher degree of importance than a display object displayed in an x-th region is displayed in an (x−1)th region located inside the x-th region (x is 2 or a greater integer) and displaying with emphasis a second display object that has a selection frequency higher than a predetermined value, the selection frequency is a frequency of selecting the second display object after selecting a first display object, if the first display object is selected.

10. The display control method according to claim 9, wherein the display objects displayed in each of the ring-shaped region are arranged in the clockwise direction in the descending order of importance degree, from a certain position above the center of the ring-shaped region.

11. The display control method according to claim 9, wherein information about a relation between the display objects and the process object are acquired, it is determined that the more any display object is related to the process object, the more important the display object is, from the information acquired by the importance-information acquisition unit, and on the basis of a degree of importance determined by the importance-degree determining unit, the display objects are displayed in the display region composed of substantially ring-shaped first to n-th regions (n is 2 or a greater integer) concentric to one another, such that a display object having a higher degree of importance than a display object displayed in an x-th region is displayed in an (x−1)th region located inside the x-th region (x is 2 or a greater integer).

12. The display control method according to claim 9, which further comprises acquiring identification information for identifying a user and determining that the higher the selection frequency the display object has, the more important the display object is, from the information acquired by the importance-information acquisition unit, in which the data concerning the selection history of the user corresponding to the ID data acquired by the ID-data acquisition unit is acquired, and in which when the identification information acquired is logged in, the display objects are displayed, on the basis of a degree of importance determined from the selection history of the user corresponding to the ID data, in the display region composed of substantially ring-shaped first to n-th regions (n is 2 or a greater integer) concentric to one another, such that a display object having a higher degree of importance than a display object displayed in an x-th region is displayed in an (x−1)th region located inside the x-th region (x is 2 or a greater integer).

13. The display control method according to claim 9, wherein the display objects belong to any one of groups that correspond to the substantially ring-shaped regions, respectively, information about the group to which the display objects belong is acquired, and the display objects are displayed on the basis of the information acquired, such that the more important the display objects of any group are, in the more inner substantially ring-shaped region they are displayed.

14. The display control method according to claim 9, which further comprises setting positions in each substantially ring-shaped region, where any given display objects are to be displayed, and in which the display objects are displayed at the positions in the substantially ring-shaped region, which have been set.

15. The display control method according to claim 9, wherein the display region is displayed on a left side of the center of the screen, above the center of the screen, or both on the left side of the center of the screen and above the center of the screen.

16. The display control method according to claim 9, wherein, when the set item corresponding to the display objects displayed in the substantially ring-shaped region is set, the display objects, which correspond to a set item set next to the that set item and more frequently than a predetermined threshold value, are displayed in an emphasized form.

17. The display control method according to claim 9, wherein, when the set item corresponding to the display objects displayed in the substantially ring-shaped region is set, the display objects, which correspond to a set item to be set next to the that set item, are displayed in an emphasized form.

18. A display control device for displaying, on a screen, a plurality of display objects related to a process object to undergo a predetermined process and associated with items set for the predetermined process, said device comprising:

object-information acquisition means for acquiring information for identifying the process object;

extraction means for extracting, from the display objects, some display objects corresponding to set items that can be used to perform the predetermined process on the process object identified on the basis of the information acquired by the object-information acquisition means;

importance-information acquisition means for acquiring information representing a degree of importance that the display object extracted by the extraction means has in connection with display on the screen; and control means for displaying, in accordance with the information acquired by the importance-information acquisition means, the display objects extracted by the extraction means in a display region composed of substantially ring-shaped first to n-th regions (n is 2 or a greater integer) concentric to one another, such that a display object having a higher degree of importance than a display object displayed in an x-th region is displayed in an (x−1)th region located inside the x-th region (x is 2 or a greater integer) and displaying with emphasis a second display object that has a selection frequency higher than a predetermined value, the selection frequency is a frequency of selecting the second display object after selecting a first display object, if the first display object is selected.

* * * * *